US007016818B1

(12) United States Patent
Kido et al.

(10) Patent No.: US 7,016,818 B1
(45) Date of Patent: Mar. 21, 2006

(54) METHOD OF EVALUATING THE POWER TRANSMISSION ABILITY OF FRICTIONAL POWER TRANSMISSION BELT AND METHOD OF AIDING THE DESIGNING FOR BELT DRIVE SYSTEM

(75) Inventors: Ryuichi Kido, Hyogo (JP); Mitsuhiko Takahashi, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 1013 days.

(21) Appl. No.: 09/637,064

(22) Filed: Aug. 11, 2000

(30) Foreign Application Priority Data

Aug. 19, 1999 (JP) ................................. 11-232785

(51) Int. Cl.
G06F 17/10 (2006.01)
G06G 7/48 (2006.01)
F16G 1/00 (2006.01)

(52) U.S. Cl. .............................. 703/2; 703/6; 474/237
(58) Field of Classification Search .................... 703/2, 703/6; 474/237
See application file for complete search history.

(56) References Cited

U.S. PATENT DOCUMENTS 3,739,632 A     6/1973  Miller et al.
5,259,272 A  *  11/1993 Yamamoto et al. .......... 315/150
5,417,619 A  *   5/1995 Tajima et al. ................ 474/260

FOREIGN PATENT DOCUMENTS

JP        60-231044 A    11/1985
JP        02-141743 A    11/1990
JP        2000-74154 A    3/2000
JP        2000-190399 A   7/2000

OTHER PUBLICATIONS

Moon et al.; Radial boundary vibration of misaligned v-belt drives; J Sound & Vibration; pp. 527-541; Mar. 1999.*
Kosatschewski G. et al., "Pruefmethodem Fuer Kiel—Und Zahnriemen" Technische Rundschau, Hallway Verlag. Bern, Ch, vol. 82, No. 49, Dec. 7, 1990, pp. 84-87.
Notice of Reasons of Rejection, JP 11-232785, mailed Oct. 8, 2002. there are no "reasons for rejection".

* cited by examiner

Primary Examiner—Hugh Jones
(74) Attorney, Agent, or Firm—Nixon Peabody LLP

(57) ABSTRACT

The power transmission ability of a belt for high power transmission is predicted. A power transmission ability curve of the belt that does not depend on the layout relative to the pulleys is found, thereby to facilitate evaluation of the belt power transmission ability and designing of the transmission condition of a belt drive system. To this end, for the high power transmission belt, a relational expression between the WD factor which is the pressing force against pulleys per belt unit length and the ST factor which is the effective tension of the belt per unit contact length to the pulleys is found. Based on the relational expression, evaluation of the power transmission ability of the belt is conducted. The WD-ST relational expression becomes a power transmission ability curve which is inherent to the belt B but independent of the layout relative to the pulleys, therefore facilitating evaluation of the belt power transmission ability and designing of the transmission condition of the belt drive system.

8 Claims, 11 Drawing Sheets

METHOD OF EVALUATING THE POWER TRANSMISSION ABILITY OF FRICTIONAL POWER TRANSMISSION BELT AND METHOD OF AIDING THE DESIGNING FOR BELT DRIVE SYSTEM

BACKGROUND OF THE INVENTION (a) Technical Field of the Invention

The present invention relates to a method of evaluating the power transmission ability of a frictional power transmission belt, and to a method of aiding the designing for a belt drive system.

(b) Prior Art

When evaluating the power transmission ability of a frictional power transmission belt, an important characteristic of the power transmission ability evaluation of the belt is a characteristic that indicates a relationship between the shaft load (initial belt tension) for the slip ratio of the belt and the loading torque. Concretely, when the slip ratio is reached at its allowable limit (usually, 1%), as the shaft load is decreased and the loading torque is increased, the belt power transmission ability is evaluated highly. As a power transmission ability curve represented by such an allowable slip ratio, there is one known in the art in which the shaft load is plotted on the abscissa while the ST factor by loading torque normalization is plotted on the ordinate. Based on such a curve, evaluation of the power transmission ability of the belt is conducted.

Reference is made to FIG. 4 which illustrates a layout for evaluation of the belt power transmission ability. A belt c is wound around a driving pulley a and a driven pulley b. A load W is applied, at different values, to the driven pulley b for the application of belt tension by varying the center distance between the pulleys a and b. Then, for each value of the load W, the slip ratio of the belt for the input torque is found to obtain a curve shown in FIG. 5. However, such a curve shows only the power transmission ability of the belt in the same layout, so that it does not have generality because the transmitted torque varies, for example, when there are variations in speed ratio and in pulley diameter.

To cope with the above, the abscissa is changed from indicating the input torque to indicating the ST factor, which provides an ST diagram as shown in FIG. 6. The ST factor is the effective tension of the belt per unit contact length. As FIG. 7 shows, when the belt c is wound around the pulley a(b) having a radius r (unit: m) at a contact angle θ (unit: radian) and its effective tension is represented by Te (=T1 (tight side tension)–T2 (slack side tension)), the ST factor is given by:

$$ST = (Tq/r)/r\theta = Tq/r^2\theta = (T1-T2)/r\theta,$$

where Tq is the transmitted torque (unit: N·m).

Then, referring to FIG. 6, intersections of the respective loads with the ST diagram are obtained at a given slip ratio (for example, at a slip ratio of 1% or 2%), thereby to find a relationship between the ST factor and the shaft load (unit: N) that is maintainable at any arbitrary slip ratio, which is shown in FIG. 8. This is called a power transmission ability curve (i.e., a power transmission ability diagram) which shows a power transmission ability characteristic inherent to the belt by a value of the ST factor transmittable at a given slip ratio for the shaft load.

However, in the foregoing conventional method, even when the same belt is employed, there is the problem that the power transmission ability curve varies depending on the layout (the pulley diameter and the speed ratio) relative to the pulleys. For example, the same belt is run to find power transmission ability curves at three different speed ratios (i.e., in a Low condition in which the pulley diameter of the driving pulley is smaller than that of the driven pulley, in a Mid condition in which the driving and driven pulleys have the same diameter, and in a Hi condition in which the diameter of the driving pulley is greater than that of the driven pulley). The power transmission ability curves found in these conditions are different, as shown in FIGS. 9–11. FIGS. 9–11 show the Low condition, the Mid condition, and the Hi condition, respectively. In FIGS. 9–11, the driving pulley is referenced as Dr and the driven pulley is referenced as Dn.

Therefore, it is necessary to introduce some correction factor for the designing of a transmission condition (service condition) in a belt drive system for a belt whose power transmission ability curve varies depending on the layout relative to pulleys.

An object of the present invention is to facilitate evaluation of the belt power transmission ability and design of the transmission condition in a belt drive system by finding a belt power transmission ability curve that does not depend on the layout relative to pulleys without having to introduce any correction factor.

SUMMARY OF THE INVENTION

In order to achieve the above-described object, the present invention was made based on the following findings. That is, when finding the power transmission ability of a belt, instead of plotting the shaft load on the abscissa, the value derived from dividing the sum of a tension on the belt tight side and a tension on the belt slack side by the pulley diameter, i.e., pulley pressing force per belt unit length (hereinafter referred to as the WD factor), is plotted on the abscissa, whereby a single power transmission curve is obtained for each belt, regardless of the layout relative to the pulleys. Based on the power transmission ability curve, evaluation of the belt power transmission ability is conducted.

The present invention provides a method of evaluating the power transmission ability of a frictional power transmission belt which is wound around pulleys to transmit power, wherein for the frictional power transmission belt a relational expression between the WD factor which is pressing force to the pulleys per belt unit length (the value found by division of tension sum by pulley diameter) and the ST factor which is an effective tension of the frictional power transmission belt per unit contact length (the value found by division of belt effective tension by pulley contact length) is found. Then, from the relational expression found, evaluation of the power transmission ability of the frictional power transmission belt is conducted.

When a belt is wound around a pulley having an effective pulley diameter D (unit: m), the WD factor (unit: N/m) is given by:

$$WD = (T1+T2)/D,$$

where T1 is the tight side tension of the belt and T2 is the slack side tension of the belt.

The foregoing WD-ST relational expression becomes a power transmission ability curve which is inherent to the belt but independent of the layout relative to the pulleys, so that the evaluation of the belt power transmission ability becomes proper and easy to conduct, therefore facilitating, based on the power transmission ability, the designing of transmission conditions in belt drive system.

The frictional power transmission belt is formed of a flat belt, V ribbed belt, or V belt. Further, the V belt is a V belt for high power transmission which comprises an endless tension member and multiple blocks which are fixedly engaged with the endless tension member. These arrangements provide an optimal frictional power transmission belt capable of effectively exhibiting the effects of the present invention.

The present invention provides a method of aiding the designing for a belt drive system with pulleys and a frictional power transmission belt which is wound around the pulleys to transmit power. This method comprises the steps of:
for the frictional power transmission belt, finding a relational expression between WD and ST where WD is the factor which is a pressing force against the pulleys per belt unit length and ST is the factor which is an effective tension of the frictional power transmission belt per unit contact length;
from the relational expression found, evaluating the power transmission ability of the frictional power transmission belt; and
based on the belt power transmission ability evaluated, predicting a transmission condition for the belt drive system, using the power transmission ability of the frictional power transmission belt. As a result of such arrangement, like the foregoing invention, it is possible to obtain a relational expression between the WD factor and the ST factor which is inherent to the belt but independent of the layout relative to the pulleys, therefore facilitating the designing of transmission conditions in belt drive system on the basis of the belt power transmission ability.

As the transmission condition, a pulley-belt layout is predicted. Further, the frictional power transmission belt is a variable speed V belt and a range of variable speed for the variable speed V belt is predicted as the transmission condition. In accordance with these inventions, transmission conditions as the effects of the foregoing invention can be exhibited effectively.

PREFERABLE EMBODIMENT

Figure 2:
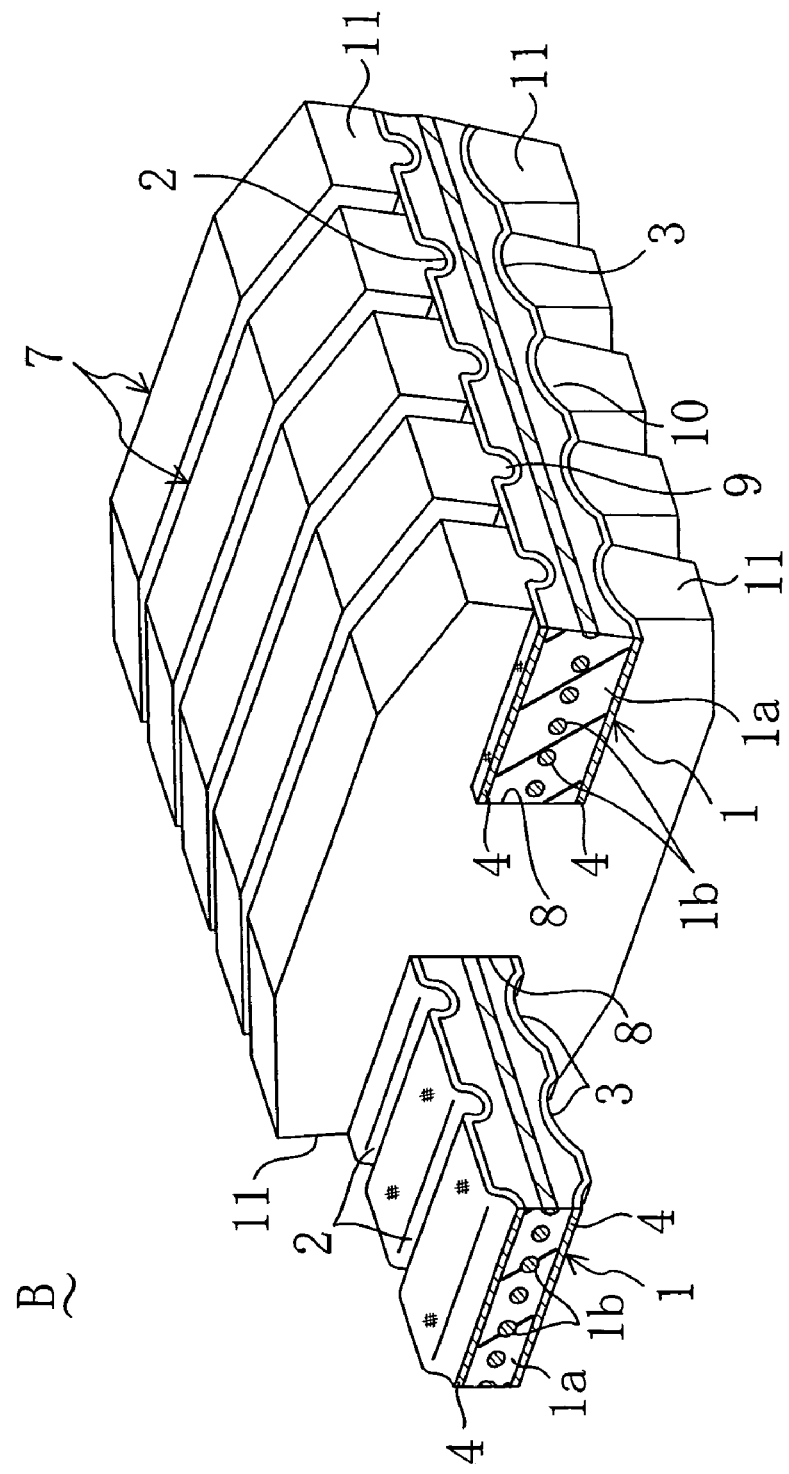
FIG. 2 is an enlarged perspective view of a belt for high power transmission relating to an embodiment of the present invention.

Referring to the drawings, an example of embodiment of the present invention as a preferable concrete example thereof will be described below. First, a frictional power transmission belt to which a method by the present invention is applied will be explained, together with a belt drive system using such a frictional power transmission belt. FIG. 2 shows a belt B for high power transmission (a block belt) serving as a variable speed V belt. The high power transmission belt B comprises a pair of endless tension members 1 disposed in the direction of the belt width and multiple blocks 7 which are fixedly engaged with the pair of tension members 1 in the direction of the belt length and in a continuous fashion. Each tension member 1 has a plurality of core wires 1*b* spirally arranged and embedded in the inside of a shape keeping layer 1*a* of hard rubber. The core wire 1*b* is formed of a material high in strength and elastic modulus such as alamide fiber. Formed on the top surface of each tension member 1 are groove-like upper recessed portions 2 of constant pitch each of which extends in the direction of the belt width in an associated manner with its corresponding block 7. On the other hand, formed on the bottom surface of each tension member 1 are lower recessed portions 3 of constant pitch each of which extends in the direction of the belt width in an associated manner with the upper recessed portions 2. Further, with a view to improving, for example, the wear resistance of the tension members 1, a canvas 4 is adhered to the top surface and to the bottom surface of each tension member 1.

Each block 7 has, at its lateral portions with respect to the direction of the belt width, a notched groove-like fitting portion 8 so that each tension member 1 can be fitted detachably from the width direction. A contact portion 11 is formed on lateral sides of each block 7 not occupied by the fitting portion 8, being in abutment against the pulley groove face (not shown). The tension members 1 are fit in the fitting portions 8 of the blocks 7, so that the blocks 7 are continuously fixed to the tension members 1 in the direction of the belt length.

An upper projected portion 9, which is a projected ridge which engages with its corresponding upper recessed portion 2 on the top surface of the tension member 1, is formed on an upper wall face of the fitting portion 8 in each block 7. On the other hand, a lower projected portion 10, which is a projected ridge which engages with its corresponding lower recessed portion 3 on the bottom surface of the tension member 1, is formed on a lower wall face of the fitting portion 8. The upper and lower projected portions 9 and 10 run parallel with each other. When the upper and lower projected portions 9 and 10 of each block 7 engage with the upper and lower recessed portions 2 and 3 of the tension member 1 respectively, the blocks 7 are fixedly engaged with the tension members 1 in the direction of the belt length. In such a state of engagement, the contact portions 11 which are the lateral sides of each block 7 are brought into contact with the pulley groove face.

Each of the blocks 7 is formed of a hard resin material. A reinforcing member having an approximately H-shape and formed of, for example, a light-weight aluminum alloy is so embedded in the inside of the block 7 as to lie at approximately the center thereof, which is not shown in the figure.

At the upper and lower projected portions 9 and 10 (i.e., where the block 7 engages the tension member 1) and at the contact portions 11 of the lateral sides (i.e., where the block 7 is brought into sliding contact with the pulley groove face), the reinforcing member is embedded in the hard resin so that it is not exposed at the block's 7 surface (since these portions are formed of hard resin). However, the reinforcing member may be arranged to expose at other surface portions of the block 7.

Figure 3:
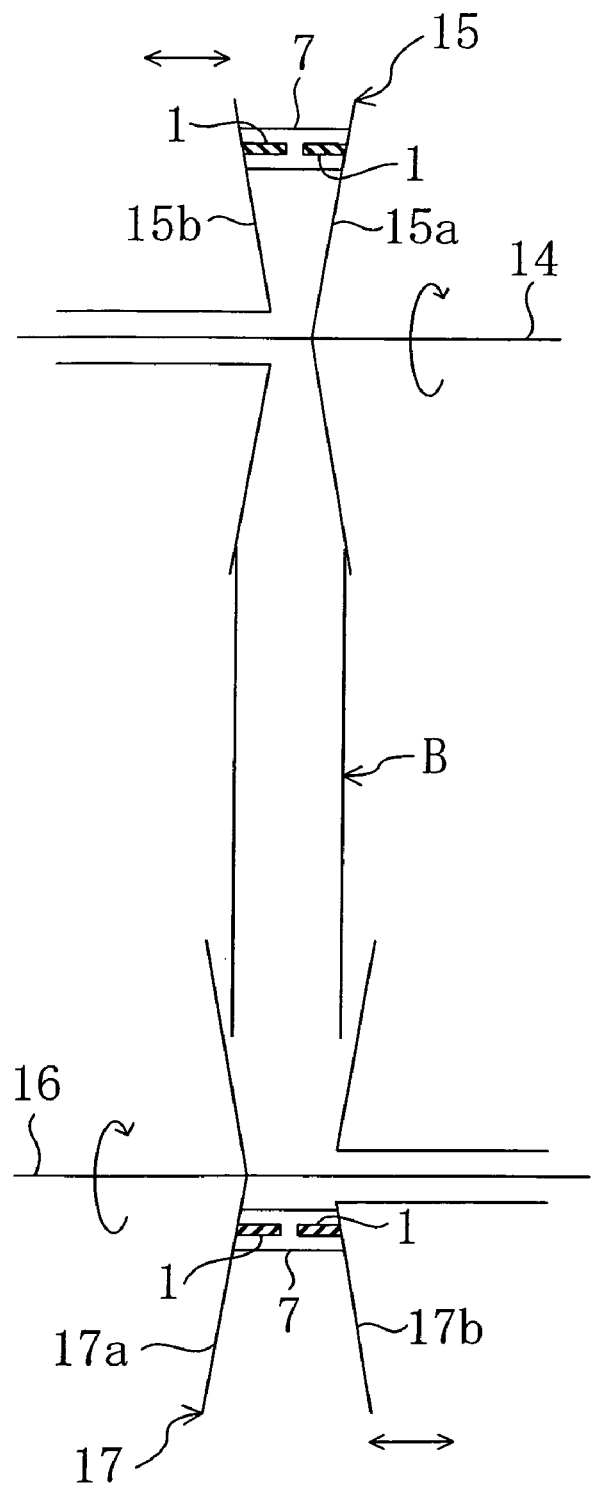
FIG. 3 is a schematic showing in cross section an infinite variable speed drive apparatus relating to the embodiment of the present invention.
Figure 4:
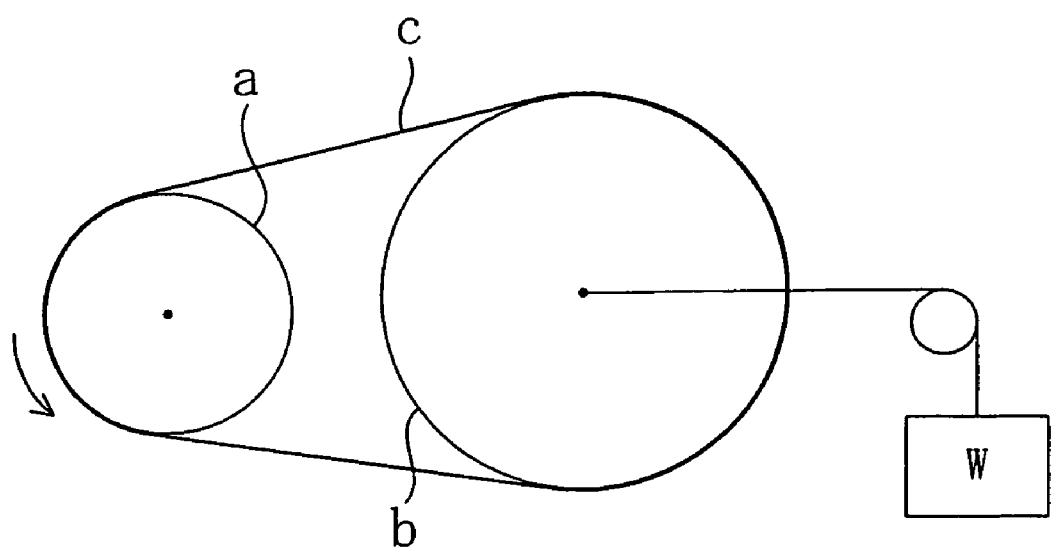
FIG. 4 is an explanatory diagram showing a layout in which a belt is wound around pulleys for evaluating the power transmission ability of the belt.
Figure 5:
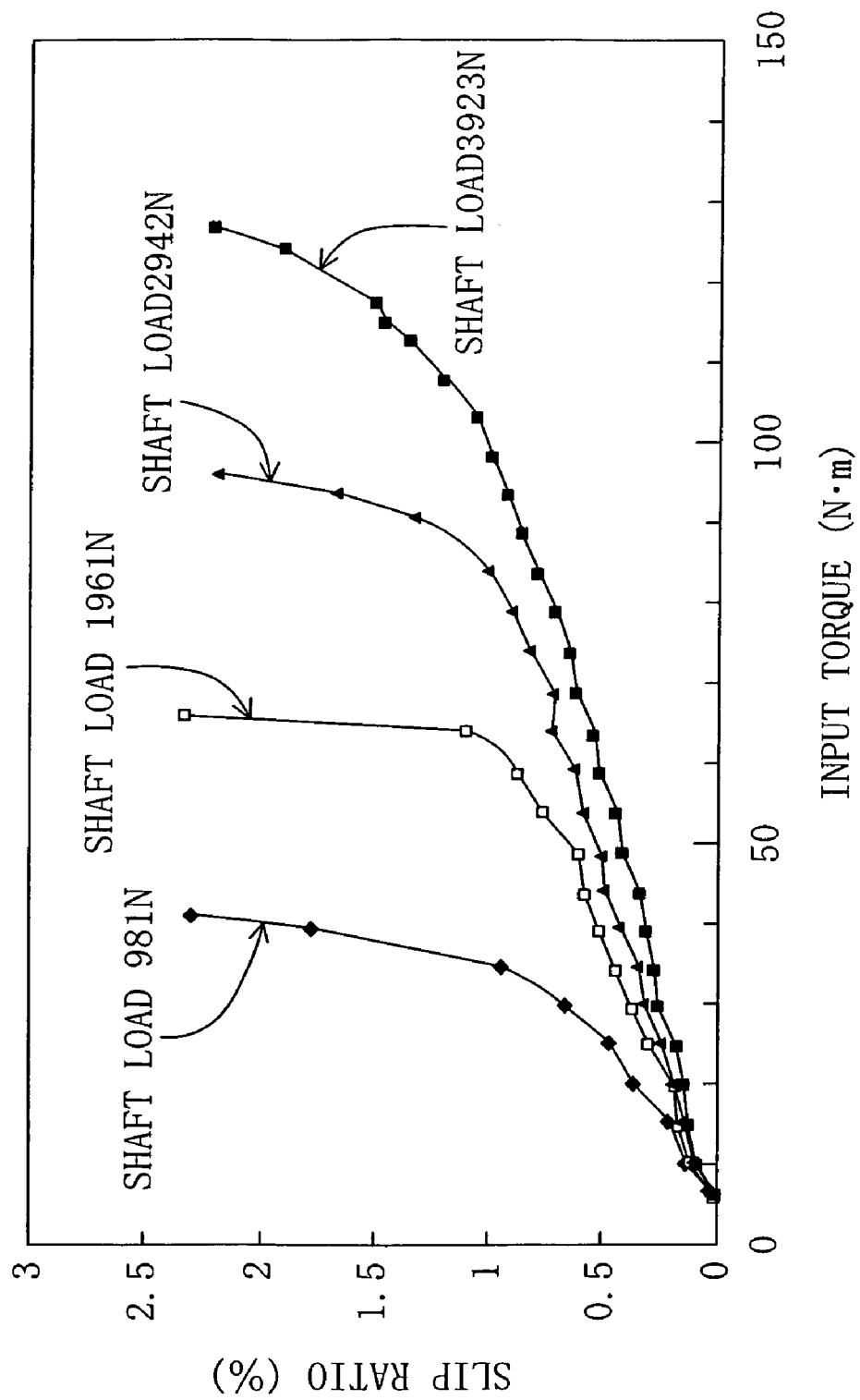
FIG. 5 is a graph showing the characteristic of the belt slip ratio versus the input torque.
Figure 6:
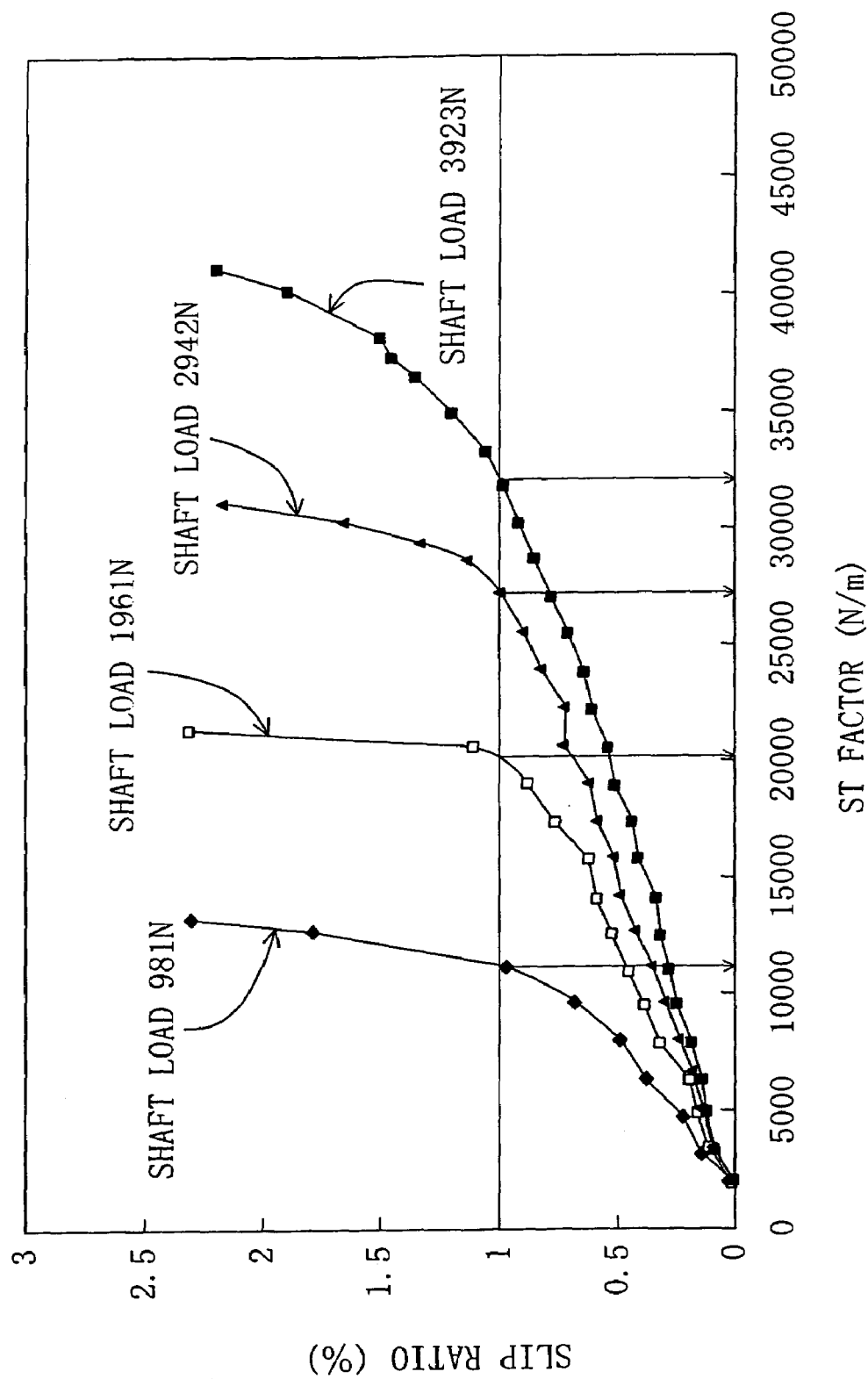
FIG. 6 is a graph showing the characteristic of the belt slip ratio versus the ST factor.
Figure 7:
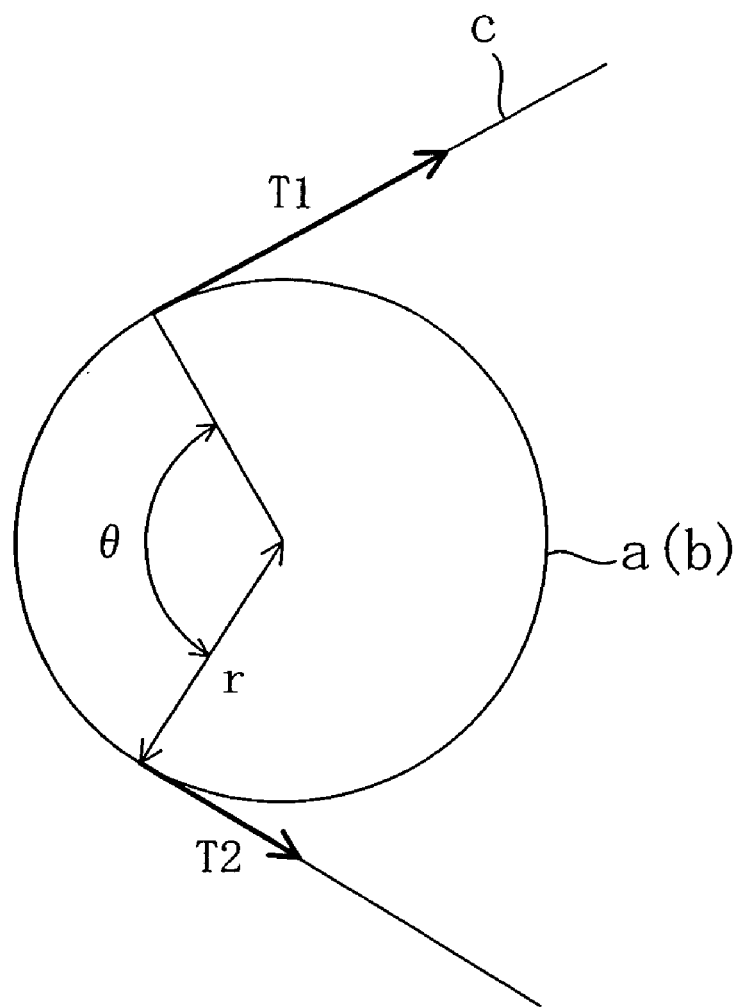
FIG. 7 is a diagram showing elements by which the ST factor is found.
Figure 8:
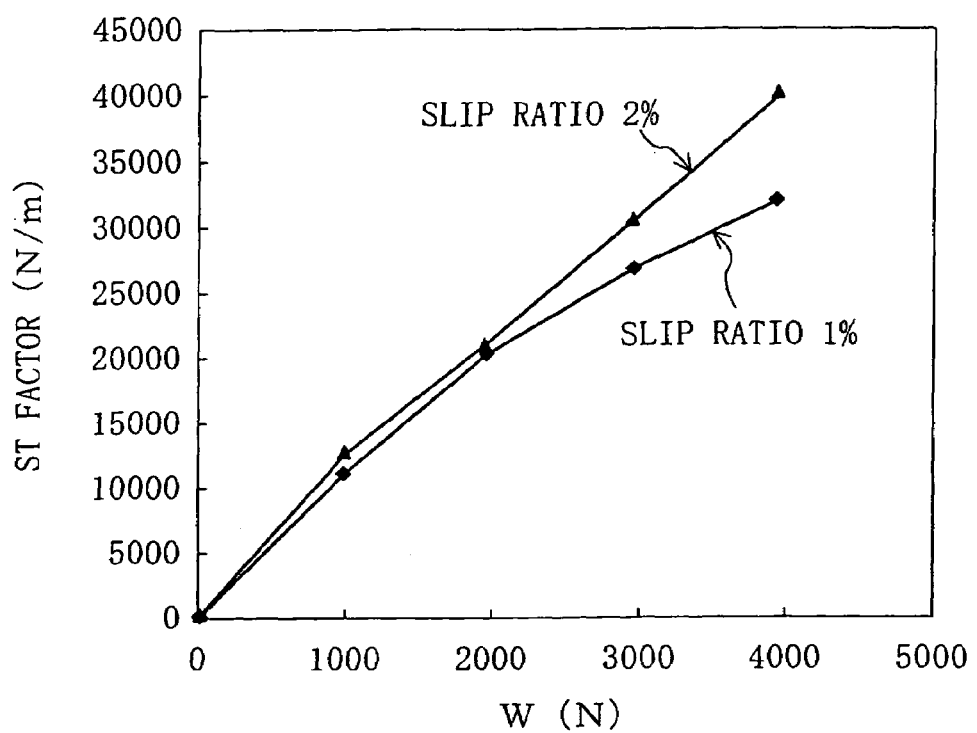
FIG. 8 is a graph showing the characteristic of the ST factor versus the shaft load in a prior art example.

The belt drive system constitutes an infinite variable speed drive apparatus. As FIG. 3 schematically shows, the infinite variable speed drive system comprises a driving and driven shafts 14 and 16 running parallel with each other, wherein a driving pulley 15 is mounted on the driving shaft 14 and a driven pulley 17 is mounted on the driven shaft 16. The pulley 15 is formed by a variable speed pulley having a fixed sheave 15a which is so secured to the driving shaft 14 as to rotate therewith and a movable sheave 15b which moves toward or away from the fixed sheave 15a. Likewise, the pulley 17 is formed by a variable speed pulley having a fixed sheave 17a which is so secured to the driven shaft 16 as to rotate therewith and a movable sheave 17b which moves toward or away from the fixed sheave 17a. The high power transmission belt B is wound around the driving and driven pulleys 15 and 17. Then, the variable sheave 15b (17b) of the pulley 15 (17) is moved toward or away from the fixed sheave 15a (17a) so that power is transmitted between the driving shaft 14 and the driven shaft 16 while infinitely varying the speed ratio between the pulleys 15 and 17 (i.e., between the driving and driven shafts 14 and 16).

When evaluating the power transmission ability of the high power transmission belt B and predicting, from the belt power transmission ability, the variable speed range of the belt B in the belt drive system (which is an infinite variable speed drive apparatus), a relational expression between the WD factor and the ST factor for the high power transmission belt B is first obtained in the embodiment of the present invention, wherein WD is the pressing force that is applied to a pulley per belt unit length, whereas ST is the effective tension of the belt B per unit belt contact length to a pulley (the pulleys 15 and 17).

The ST factor (unit: N/m) is a value that is found by dividing the effective tension of the belt B by the length of contact of the belt to a pulley (the pulleys 15 and 17). As described hereinbefore, the belt B is wound around the pulleys 15 and 17 having an effective pulley radius r (unit: m) at a contact angle θ (unit: radian). The ST factor is given by:

$$ST = (Tq/r)/r\theta = Tq/r^2\theta = (T1-T2)/r\theta$$

where T1 is the tight side tension of the belt B, T2 is the slack side tension of the belt B, Te (=T1−T2) is the effective tension of the belt B, and Tq (unit: N·m) is the transmitted torque (see FIGS. 4 to 8).

On the other hand, the WD factor is a value (unit: N/m) that is found by dividing the sum of tensions (T1+T2) (unit: N) by the effective diameter D (unit: m) of the pulleys 15 and 17. The WD factor is given by:

$$WD = (T1+T2)/D$$

Figure 1:
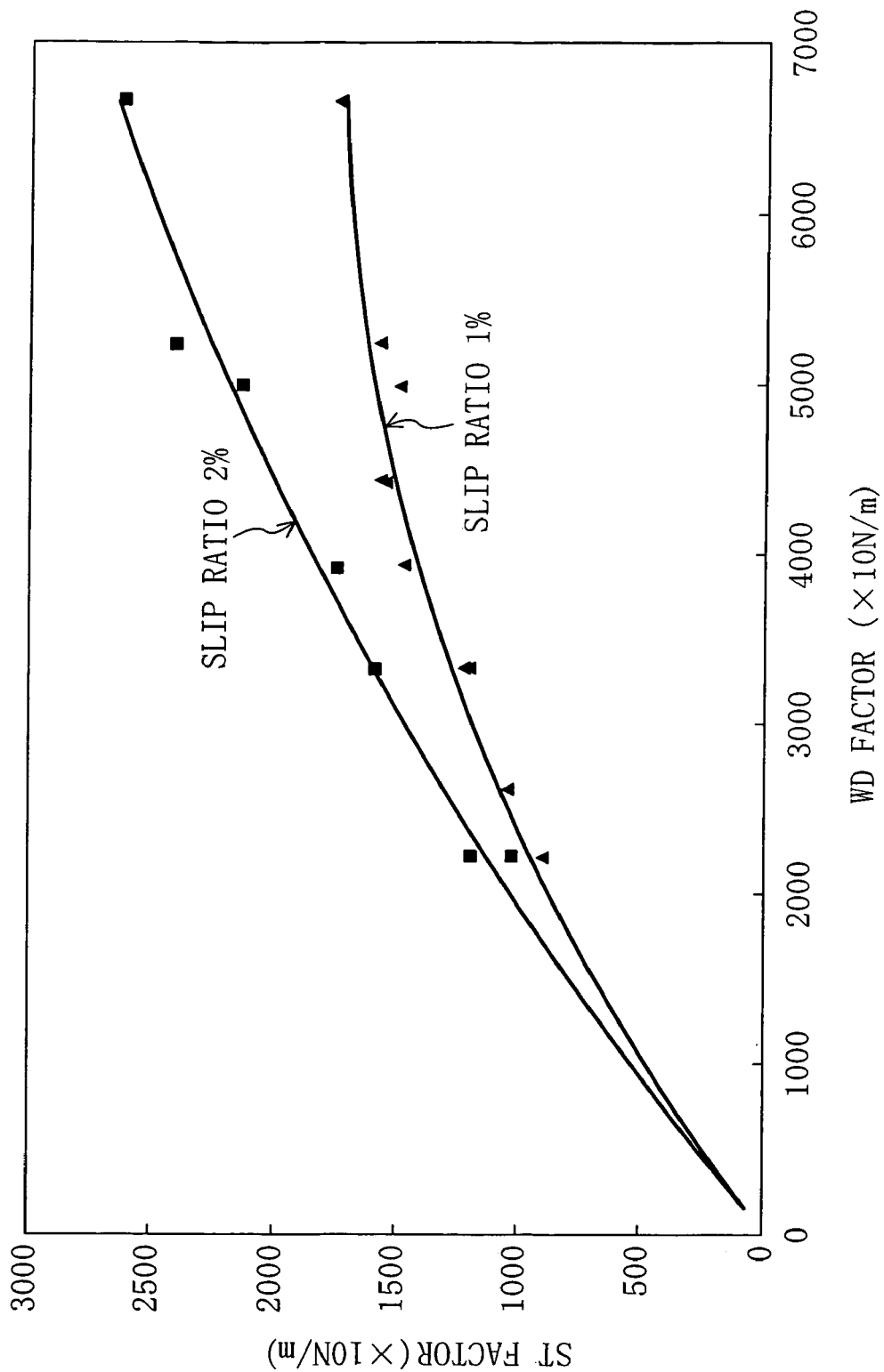
FIG. 1 is a characteristic diagram showing relationships between the WD factor and the ST factor for a slip ratio of 1% and for a slip ratio of 2% with respect to a belt for high power transmission.

If the foregoing relational expression is graphically represented so that the abscissa indicates the WD factor and the ordinate indicates the ST factor, this results in different transmission curves for each slip ratio, as shown in FIG. 1. The belt B is evaluated in power transmission ability by the foregoing relational expression.

Next, based on the power transmission ability of the belt B thus found, the variable speed range of the high power transmission belt B is predicted as a transmission condition (service condition) for the foregoing belt drive system.

Therefore, in the present embodiment, the relational expression of the WD factor and the ST factor for the high power transmission belt B (i.e., the power transmission ability curve) is inherent to the belt B, in other words, the WD-ST relational expression does not depend upon the layout relative to the pulleys 15 and 17. The power transmission ability of the belt B is evaluated from the relational expression, which makes it possible to properly evaluate the power transmission ability of the belt B without having to require any correction factor. In addition, the belt power transmission ability can be readily evaluated. Furthermore, prediction of the variable speed range in the belt drive system can be easily carried out based on the power transmission ability of the belt B.

In the foregoing embodiment, the frictional power transmission belt is in the form of the high power transmission belt B (block belt) which is a variable speed V belt and the belt drive system is in the form of an infinite variable speed drive apparatus. However, the present invention is applicable to other types of frictional power transmission belts and to belt drive system employing any one of such frictional power transmission belts. In addition to commonly-used V belts, flat belts and V ribbed belts may be used as a frictional power transmission belt as long as they are a friction transmission type. Further, as a belt drive system, there are a V belt drive system, flat belt drive system, and V ribbed belt drive system.

Additionally, in the foregoing embodiment, the variable speed range of the belt drive system (infinite variable speed drive system) is predicted from the power transmission ability of the high power transmission belt B. However, a belt-pulleys layout can be predicted as a transmission condition. In such a case, the method of the present invention is also applicable to a belt drive system of multiple shaft transmission in which the belt is wound around three or more pulleys.

Next, there will be explained concrete examples in which the present invention is put into practice. Specifically, four different test conditions (layouts) were set in which different pulley diameters and different center distances were employed for the driving and driven pulleys of the belt drive system. The high power transmission belts of the same type were wound around the driving and driven pulleys to run.

The four different test conditions are shown in the following TABLE.

TABLE

| TEST CONDITION | 1 | 2 | 3 | 4 |
|---|---|---|---|---|
| DRIVING PULLEY DIA. (mm) | 60 | 90 | 54.56 | 137.3 |
| DRIVEN PULLEY DIA. (mm) | 60 | 90 | 136.40 | 68.6 |
| SPEED RATIO | 1.0 | 1.0 | 0.4 | 2.0 |
| CENTER DIS. (mm) | 250.80 | 203.60 | 190.61 | 180.00 |
| BELT PITCH CIRCUMFERENCE LENGTH (mm) | 690 | ← | ← | ← |
| ROTATION SPEED OF DRIVING PULLEY (rpm) | 2600 | ← | ← | ← |
| DRIVEN SHAFT TORQUE (Nm) | 5–90 | 5–130 | 5–190 | 5–140 |

TABLE-continued

| TEST CONDITION | 1 | 2 | 3 | 4 |
|---|---|---|---|---|
| SHAFT LOAD (kN) | 1.0<br>2.0<br>3.0<br>4.0 | ← | ← | ← |
| AMBIENT TEMP. | ORDINARY TEMP. | ← | ← | ← |

Figure 9:
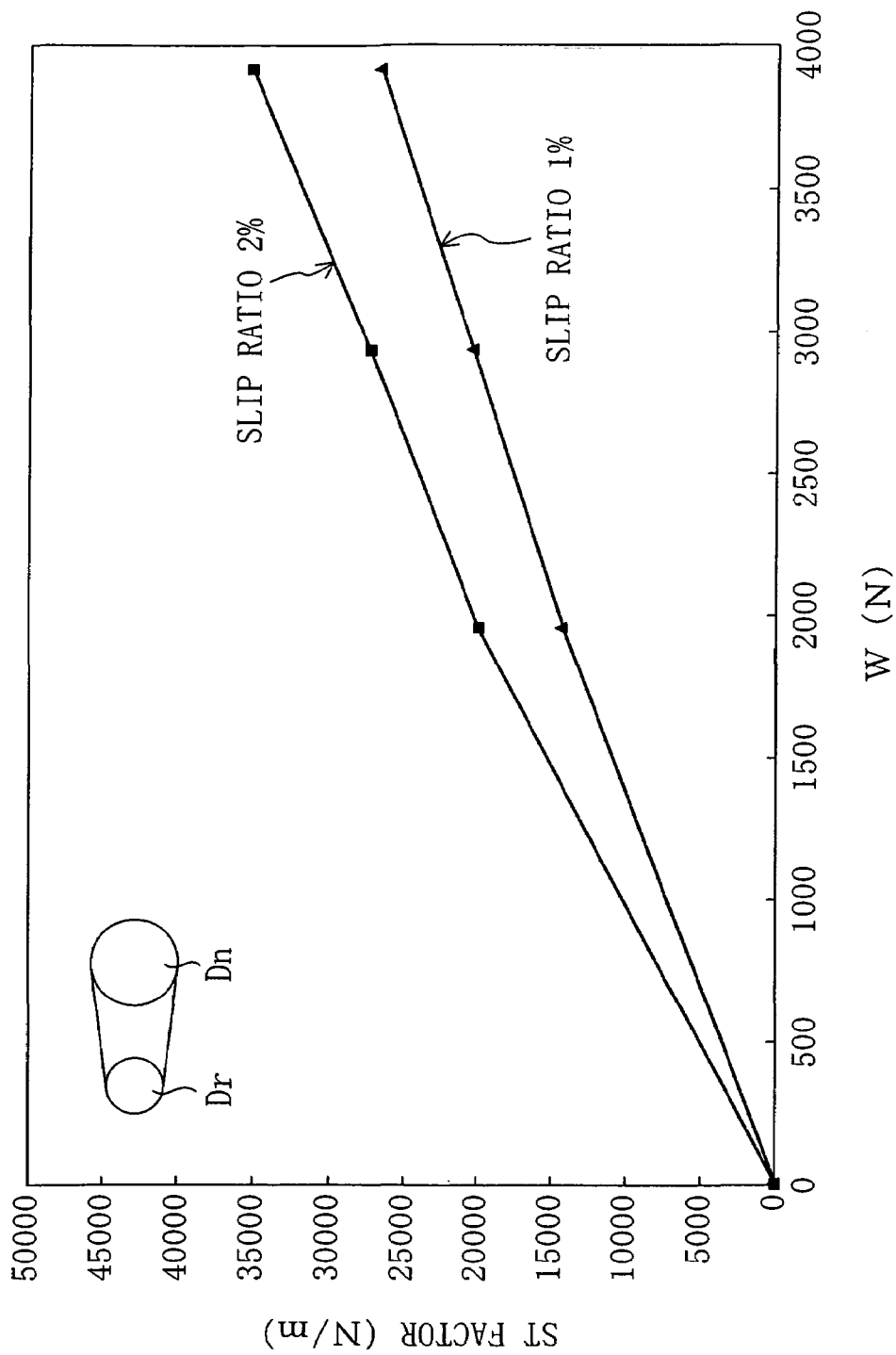
FIG. 9 is a graph showing the characteristic of the ST factor versus the shaft load when the layout is in a Low condition.
Figure 10:
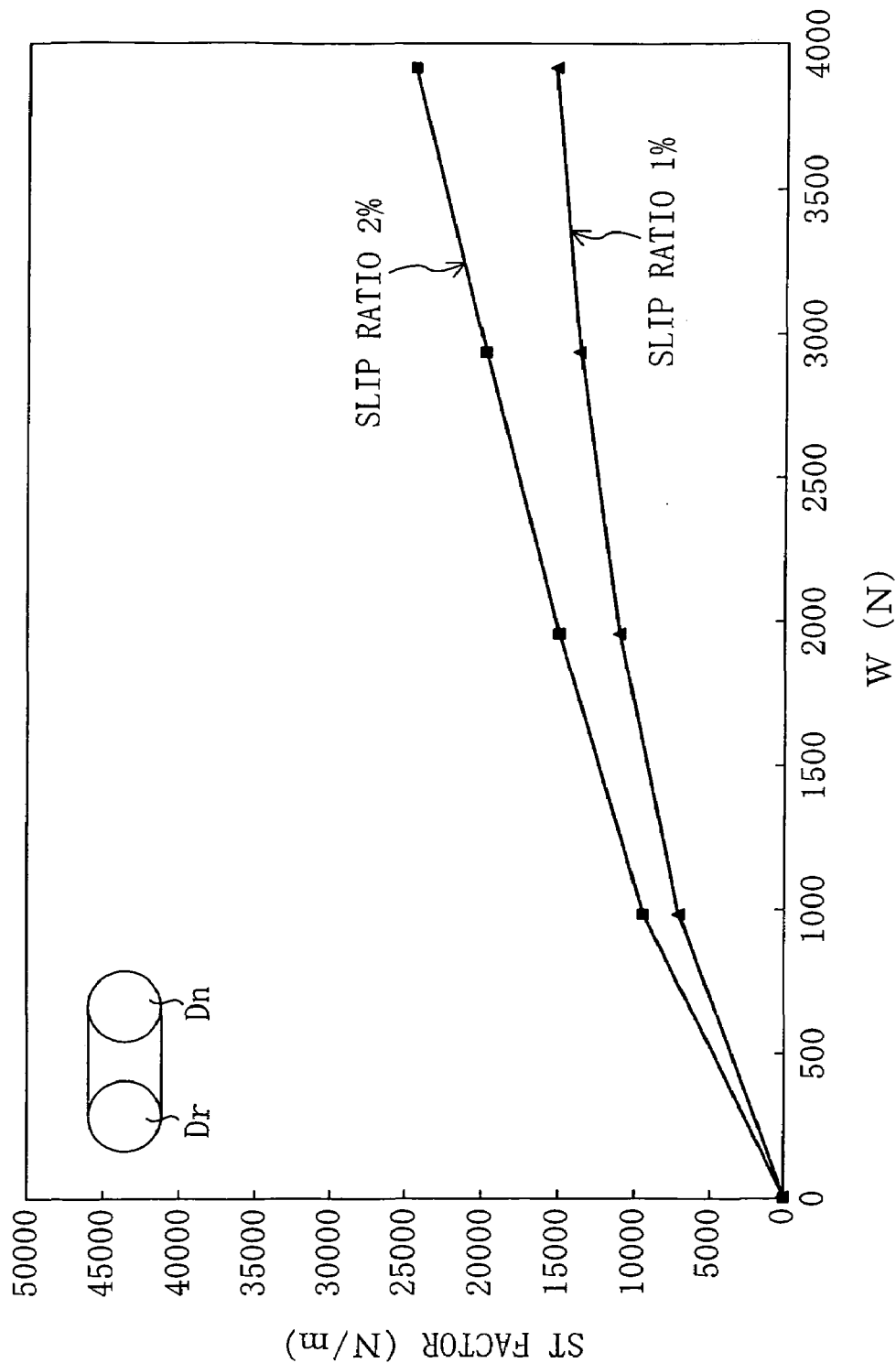
FIG. 10 is a graph similar to FIG. 9 but shows the characteristic when the layout is in a Mid condition.
Figure 11:
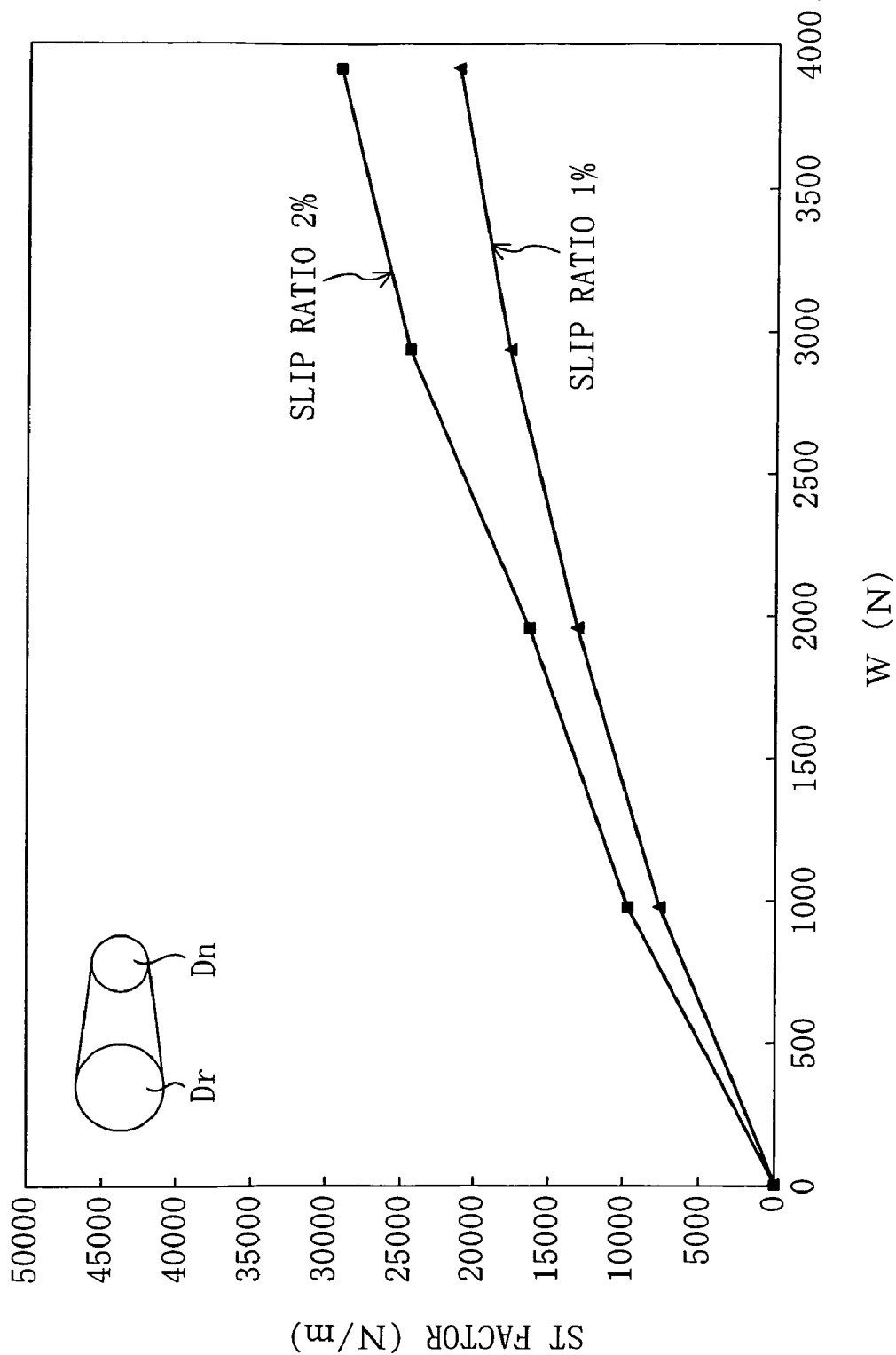
FIG. 11 is a graph similar to FIG. 9 but shows the characteristic when the layout is in a Hi condition.

A conventional method was used to depict power transmission ability curves for condition 1 (Mid condition), condition 3 (Low condition), and condition 4 (Hi condition), respectively. FIGS. 9–11 show these curves. FIGS. 9–11 represent the condition 3 (Low condition), the condition 1 (Mid condition), and the condition 4 (Hi condition), respectively. In FIGS. 9 to 11, Dr and Dn designate the driving pulley and the driven pulley, respectively.

As seen from FIGS. 9 to 11, the power transmission ability curve varies depending on the layout of the belt relative to the pulleys. The Mid condition exhibits the highest power transmission ability. The Hi condition exhibits the second highest power transmission ability. The Low condition exhibits the lowest power transmission ability. The conceivable reason for this is that since these power transmission ability curves are associated with slippage (friction) occurring between the belt and each pulley, the pressing force and tractive power working on both of them are predominant factors so that the shaft load plotted on the abscissa is a characteristic alternative to the pressing force and the ST factor plotted on the ordinate is a characteristic alternative to the tractive power. Additionally, since the ST factor plotted on the ordinate is obtained by dividing the effective tension of the belt by the contact length, the ST factor is an index that can be universally evaluated even if the layout is changed. On the other hand, the shaft load is not a universal index because the pressing force varies with the layout. For this reason, it is conceivable that the power transmission ability curve of the belt varies depending on the layout.

Using the method of the present invention, data at a slip ratio of 1% and data at a slip ratio of 2% were found at three different levels of the shaft load for each of the four test conditions. When these data thus found were expressed by a coordinate system in which the WD factor is plotted on the abscissa with the ST factor on the ordinate, the result shown in FIG. 1 was obtained and the regression curve of these data was obtained as a power transmission ability curve. It should be noted that when the driving and driven pulleys differ in pulley diameter from each other, only the ST factor calculated based on the pulley having a smaller diameter is used in the conventional methods, but the method of the present invention is designed to calculate the WD and ST factors of the driving and driven pulleys, wherein the average of the WD factors calculated and the average of the ST factors calculated are used as their representative values. It is obvious from FIG. 1 that the data can be represented by a single regression curve (power transmission ability curve) irrespective of the layout of the belt relative to the pulleys.

In the method of the present invention, a power transmission ability curve for a belt which does not depend upon the layout of a belt relative to pulleys can be attained by obtaining a relational expression of the WD factor and ST factor of the belt. It has been accordingly proved that if evaluation of the belt power transmission ability is conducted using the attained power transmission ability curve, this facilitates evaluation of the belt power transmission ability and further facilitates designing of the transmitting condition in a belt drive system on the basis of the evaluation result.

What is claimed is:

1. A method of evaluating the power transmission ability of a frictional power transmission belt which is wound around a plurality of pulleys to transmit power, said method comprising the steps of:

for said frictional power transmission belt, calculating WD factors and ST factors on each pulley side, respectively, where the WD factor represents pressing force to each of said pulleys per belt unit length and the ST factor represents an effective tension of said frictional power transmission belt per unit contact length, and finding a relational expression between the WD factor and the ST factor based on an average of the WD factors calculated and an average of the ST factors calculated; and from said relational expression found, evaluating the power transmission ability of said frictional power transmission belt.

2. The method of claim 1,
wherein said frictional power transmission belt is a flat belt.

3. The method of claim 1,
wherein said frictional power transmission belt is a V ribbed belt.

4. The method of claim 1,
wherein said frictional power transmission belt is a V belt.

5. The method of claim 4,
wherein said V belt is a V belt for high power transmission which comprises an endless tension member and multiple blocks which are fixedly engaged with said endless tension member.

6. A method of aiding the design for a belt drive system with a plurality of pulleys and a frictional power transmission belt which is wound around said plurality of pulleys to transmit power, said method comprising the steps of:

for said frictional power transmission belt, calculating WD factors and ST factors on each pulley side, respectively, where the WD factor represents pressing force to each of said pulleys per belt unit length and the ST factor represents an effective tension of said frictional power transmission belt per unit contact length, and finding a relational expression between the WD factor and the ST factor based on an average of the WD factors calculated and an average of the ST factors calculated;

from said relational expression found, evaluating the power transmission ability of said frictional power transmission belt; and based on said belt power transmission ability evaluated, predicting a transmission condition for said belt drive system, using the power transmission ability of said power transmission belt.

7. The method of claim 6,
wherein a pulley-belt layout is predicted as said transmission condition.

8. The method of claim 6,
wherein said frictional power transmission belt is a variable speed V belt; and
wherein a range of variable speed for said variable speed V belt is predicted as said transmission condition.

* * * * *